(12) United States Patent
Kim et al.

(10) Patent No.: US 11,121,735 B2
(45) Date of Patent: Sep. 14, 2021

(54) PROTECTIVE CASE FOR FOLDABLE MOBILE DEVICE

(71) Applicant: SPIGEN KOREA CO., LTD., Seoul (KR)

(72) Inventors: Dae-Young Kim, Seoul (KR); Jae Hong Cho, Seoul (KR); Sun Woo Yun, Seoul (KR); Jong Hwa Lee, Seoul (KR); Kyung Joon Lee, Goyang-si (KR); Gang Il Park, Anyang-si (KR)

(73) Assignee: SPIGEN KOREA CO., LTD., Seoul (KR)

( * ) Notice: Subject to any disclaimer, the term of this patent is extended or adjusted under 35 U.S.C. 154(b) by 73 days.

(21) Appl. No.: 16/669,352

(22) Filed: Oct. 30, 2019

(65) Prior Publication Data
US 2020/0412401 A1    Dec. 31, 2020

(30) Foreign Application Priority Data

Jun. 26, 2019 (KR) .................. 10-2019-0076147

(51) Int. Cl.
*H04M 1/00*    (2006.01)
*H04B 1/3888*   (2015.01)
*H04M 1/02*    (2006.01)

(52) U.S. Cl.
CPC ........ *H04B 1/3888* (2013.01); *H04M 1/0214* (2013.01)

(58) Field of Classification Search
CPC .............. H04B 1/3888; H04M 1/0214; H04M 1/0216; H04M 1/0245
USPC ........................................... 455/575.8, 575.3
See application file for complete search history.

(56) References Cited

U.S. PATENT DOCUMENTS

| | | | | |
|---|---|---|---|---|
| 7,032,984 B2 * | 4/2006 | Kim | ...................... | G06F 1/1601 312/223.2 |
| 7,311,366 B2 * | 12/2007 | Kim | ...................... | G06F 1/1601 312/223.2 |
| D719,540 S * | 12/2014 | Lee | ........................ | D14/138 AB |
| 9,462,864 B2 * | 10/2016 | Sirichai | ................ | A45C 13/005 |
| 10,064,298 B2 * | 8/2018 | Cavenagh | ............. | H04M 1/022 |

(Continued)

FOREIGN PATENT DOCUMENTS

| | | |
|---|---|---|
| CN | 110121877 A | 8/2019 |
| JP | 4035051 B2 | 1/2008 |

(Continued)

*Primary Examiner* — April G Gonzales
(74) *Attorney, Agent, or Firm* — Heedong Chae; Lucem, PC

(57) ABSTRACT

The present invention relates to a protective case for foldable mobile device which has a first portion, a second portion, and a joining portion wherein the joining portion connects the first portion and the second portion, comprising: a first case for protecting the first portion of the foldable mobile device installed therein; a connecting portion for covering the joining portion and fixedly attached to the first case; and a second case for protecting the second portion of the foldable mobile device installed therein wherein the second case includes a second outer frame. The second outer frame comprises a recess to receive the connecting portion wherein the connecting portion slidably moves in the recess, and the second case further comprises a recess cover for covering the recess.

20 Claims, 13 Drawing Sheets

(56) References Cited

U.S. PATENT DOCUMENTS

| | | | | |
|---|---|---|---|---|
| 10,292,285 B2* | 5/2019 | Cavenagh | ............. | H04M 1/022 |
| 10,314,185 B2* | 6/2019 | Cavenagh | ............. | H05K 5/0004 |
| 10,492,318 B2* | 11/2019 | Cavenagh | ............. | H04M 1/022 |

FOREIGN PATENT DOCUMENTS

| | | |
|---|---|---|
| KR | 20-0226761 Y1 | 6/2001 |
| KR | 10-1421220 B1 | 7/2014 |
| WO | 2018089926 A1 | 5/2018 |

* cited by examiner

PROTECTIVE CASE FOR FOLDABLE MOBILE DEVICE

CROSS-REFERENCE TO RELATED APPLICATIONS

This application claims the benefit of Korean Application No. 10-2019-0076147, filed on Jun. 26, 2019, with the Korean Intellectual Property Office, the contents of which are incorporated herein by reference.

FIELD OF THE INVENTION

The present invention relates to a protective case for foldable mobile device.

BACKGROUND OF THE INVENTION

Mobile devices refer to computing devices that are intended to be carried or moved about by users. Such mobile devices are very prone to accidental damages because users carry or move about with the mobile devices on a daily basis. To protect these mobile devices against external shocks, protective cases have been widely used in connection with the mobile devices. These protective cases provide protection for mobile devices by covering the outer surface of the mobile device.

Although mobile devices generally comprise flat panel displays, efforts have been made to develop flexible displays that can be folded or bent into desired shapes. Indeed, foldable mobile devices refer to mobile devices using flexible displays such that the devices can be folded, bent, or rotated. These foldable mobile devices can change their shapes or forms due to their flexibility, and thus, have been expected as an innovative invention in the information technology field.

Some foldable mobile devices comprise at least two flat displays with a joining portion that connects the flat displays. In one embodiment, the joining portion is a hinge between the flat displays such that the devices can be folded, bent, or rotated about the hinge. In another embodiment, the joining portion is flexible and constructed to extend or expand so that the devices can be folded, bent, or rotated. In yet another embodiment, the joining portion comprises a magnetic attachment means that enables the flat displays to be removably connected to each other, and enables the devices to be folded, bent, or rotated.

However, the downside of foldable mobile devices is that it is difficult to install protective cases on these devices because the devices can change their shapes or forms. While protective cases may be easy to install on regions of the devices that remain unaltered, they are difficult to mount over the joining portion of the devices.

In other words, foldable mobile devices are not protected against external shocks because it is difficult to install protective cases on the joining portion of the devices. Thus, the joining portion of the foldable mobile devices is particularly vulnerable to damages.

Accordingly, there is a need for a protective case that can protect the joining portion of the foldable mobile devices, and conform to different shapes or forms of the foldable mobile devices as well. This invention is directed to solve these problems and satisfy the long-felt market need.

SUMMARY OF THE INVENTION

The present invention is directed to a protective case for a foldable mobile device. The present invention provides a protective case having a first case, a second case, and a connecting portion for a foldable mobile device that comprises a first portion, a second portion, and a joining portion. Here, the foldable mobile device is not limited to the devices described above. The foldable mobile device may or may not have a flexible display, and a mobile device can be regarded as a foldable mobile device as long as it has a first portion, a second portion, and a joining portion.

The object of the present invention is to provide a protective case for a foldable mobile device, comprising: a first case for protecting the first portion of the foldable mobile device installed therein; a second case for protecting the second portion of the foldable mobile device installed therein wherein the second case includes a second outer frame; and a connecting portion which changes its shape or form to cover the joining portion of the foldable mobile device. One end of the connecting portion is fixedly attached to an exterior of the first case. The second outer frame comprises a recess to receive the connecting portion and the connecting portion slidably moves in the recess. The second case further comprises a recess cover for covering and supporting at least one surface of the recess.

Another object of the present invention is to provide a protective case for a foldable mobile device, comprising: a first case for protecting the first portion of the foldable mobile device installed therein; a second case for protecting the second portion of the foldable mobile device installed therein, which includes a second inner shell and a second outer frame wherein the second outer frame is constructed to removably mount over the second inner shell; and a connecting portion which changes its shape or form to cover the joining portion of the foldable mobile device. One end of the connecting portion is fixedly attached to an exterior of the first case. The second outer frame comprises a recess to receive the connecting portion and the second inner shell 304 covers the recess. The connecting portion slidably moves in the recess.

The advantages of the present invention are: (1) the connecting portion of the present invention is constructed to change its shape and form for covering and protecting various shapes of the joining portion; (2) the connecting portion of the present invention provides protection for the externally exposed joining portion of the foldable mobile device from external shocks; (3) the second inner shell or the recess cover prevents damages to the foldable mobile device that may occur during installation of the protective case or when the connecting portion is folded, bent, or rotated; (4) the case of the present invention prevents damages such as scratches or dents to the foldable mobile device during installation of the protective case; (5) the non-slip first pad prevents the first portion from slipping and being dislodged from the first case; (6) the non-slip second pad prevents the second portion from slipping and being dislodged from the second case; (7) the grooves of the connecting portion provides flexibility to the connecting portion such that the connecting portion can actively change its shape or form to cover and protect the joining portion; (8) the recess cover or the second inner shell prevents the connecting portion from being dislodged from the second case; (9) the recess cover or the second inner shell physically isolates the recess to avoid interference with the sliding movement of the connecting portion or to prevent scratches to the device; (10) the projection of the recess prevents the connecting portion from being dislodged from the recess; and (11) due to the locking groove for receiving the protruding member of the connecting portion, the sliding movement of the connecting portion is more stably maintained in the recess.

It is to be understood that all the advantages expected or anticipated by the description of the present invention are disclosed herein as part of the advantages of the present invention, while each of them may not be specifically described herein.

Although the present invention is briefly summarized, the fuller understanding of the invention can be obtained by the following drawings, detailed description and appended claims.

BRIEF DESCRIPTION OF THE DRAWINGS

These and other features, aspects, and advantages of the present invention will become better understood with reference to the accompanying drawings, wherein.

DETAILED DESCRIPTION EMBODIMENTS OF THE INVENTION

Reference will now be made in detail to the preferred embodiments of the present invention, examples of which are illustrated in the accompanying drawings, which form a part of this disclosure. It is to be understood that this invention is not limited to the specific devices, methods, conditions or parameters described and/or shown herein, and that the terminology used herein is for the purpose of describing particular embodiments by way of example only and is not intended to limit the claimed invention.

Also, as used in the specification including the appended claims, the singular forms "a", "an", and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about", it will be understood that the particular value forms another embodiment.

Figure 1:
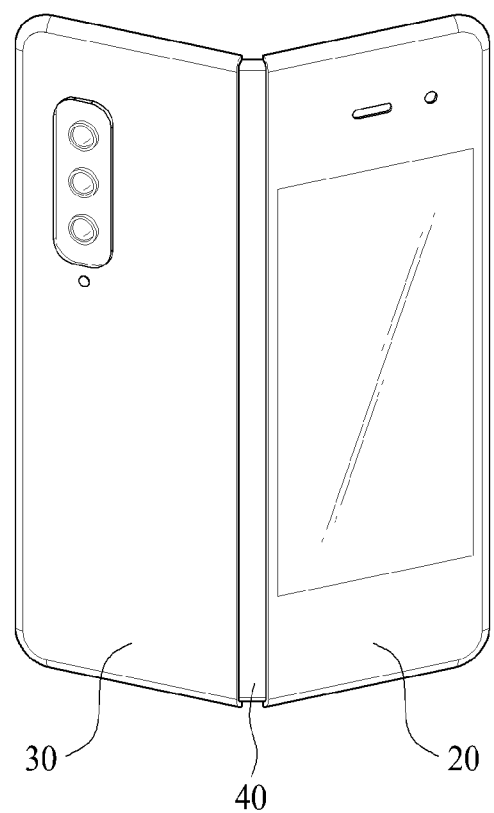
FIG. 1 is a rear perspective view of a foldable mobile device.

FIG. 1 illustrates a foldable mobile device 10. As shown in FIG. 1, the foldable mobile device 10 installed in the protective case 100 of the present invention may comprise a first portion 20, second portion 30, and joining portion 40.

The first portion 20 and second portion 30 are regions of the foldable mobile device 10 which do not change their shapes or forms. The first portion 20 may comprise flat panel displays on at least one of a front or rear surface thereof. Likewise, the second portion 30 may comprise flat panel displays on at least one of a front or rear surface thereof. The joining portion 40 is a region of the foldable mobile device 10 for connecting the first portion 20 and the second portion 30 to enable folding, bending, or rotation of the foldable mobile device 10. In an embodiment, the joining portion 40 may be a hinge between the first portion 20 and the second portion 30 such that the foldable mobile device 10 can be folded, bent, or rotated about the hinge. In another embodiment, the joining portion 40 may be flexible and constructed to extend or expand so that the foldable mobile device 10 can be folded, bent, or rotated. In yet another embodiment, the joining portion 40 may comprise a magnetic attachment means that enables the first portion 20 and the second portion 30 to be removably connected to each other, and enables the foldable mobile device 10 to be folded, bent, or rotated. As such, the joining portion 40 is constructed to allow the foldable mobile device 10 to be folded, bent, or rotated.

However, the joining portion 40 is very susceptible to external shocks. Accordingly, there is a need to keep the joining portion 40 of the foldable mobile device 10 safe from such external shocks. Conventional protective cases could mount on the first portion 20 and second portion 30 which do not change their shapes or forms, but were difficult to mount over the various shapes of the joining portion 40.

Figure 2:
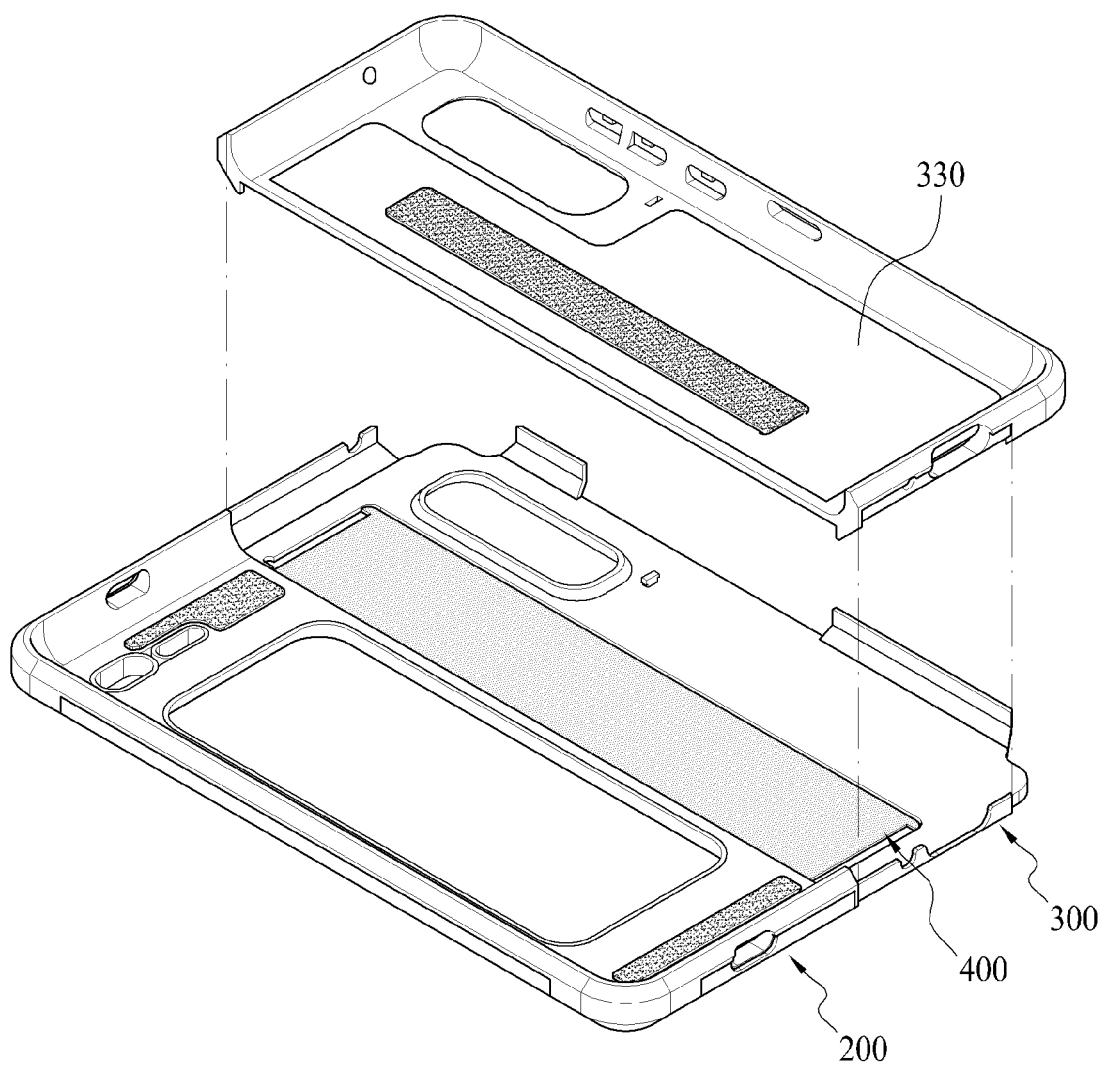
FIG. 2 is an exploded front perspective view of a protective case for the foldable mobile device according to an embodiment of the present invention.

FIG. 2 illustrates the protective case for foldable mobile device 100 according to an embodiment. As shown in FIG. 2, the protective case 100 may comprise a first case 200, a second case 300, and a connecting portion 400.

Figure 3:
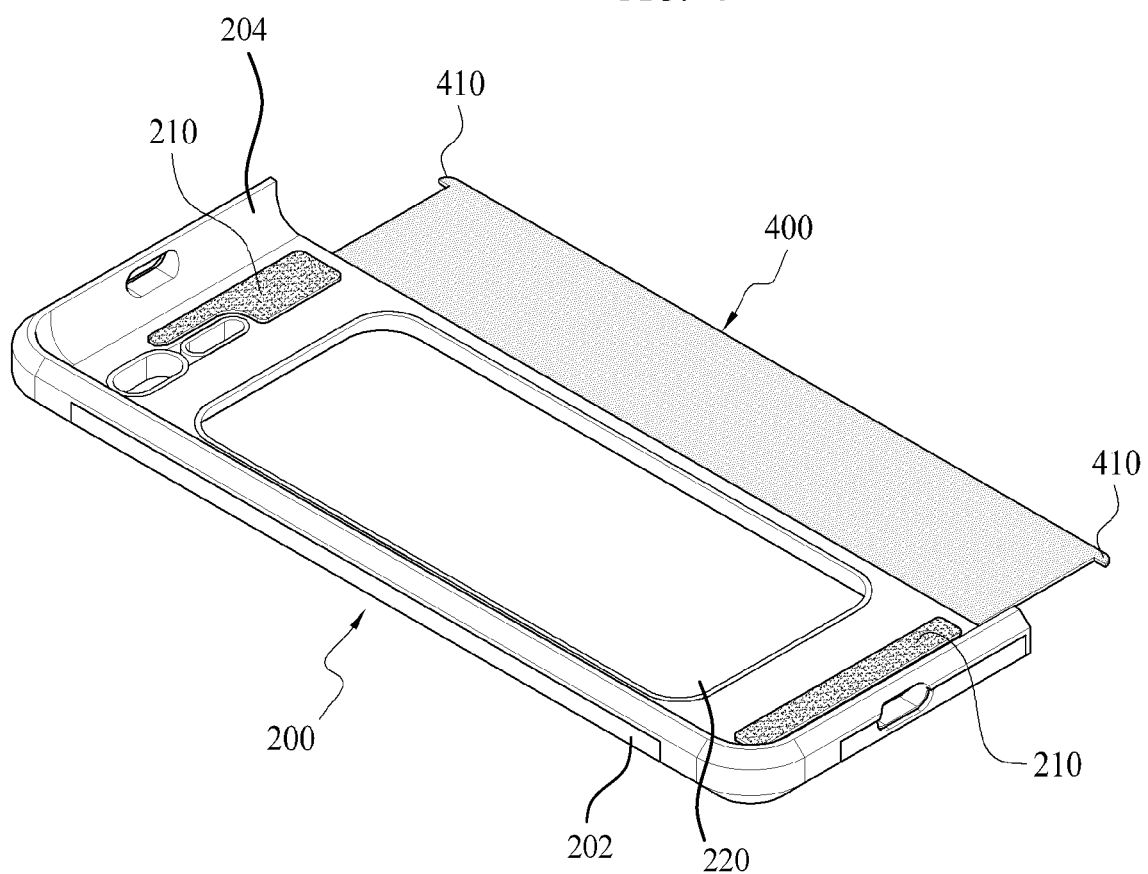
FIG. 3 is a front perspective view of a first case of the protective case for the foldable mobile device according to an embodiment of the present invention.

FIG. 3 illustrates the first case 200 of the protective case 100 according to an embodiment. The first case 200 is constructed to protect the first portion 20 of the foldable mobile device 10 installed therein. As shown in FIG. 3, the first case 200 may be fixedly attached to the connecting portion 400. Specifically, an exterior of the first case 200 may be attached to one end of the connecting portion 400.

According to an embodiment, the first case 200 of the protective case 100 may comprise a first inner shell 204 and a first outer frame 202. The first inner shell 204 is constructed to protect the first portion 20 of the foldable mobile device 10 installed therein, and the first outer frame 202 is constructed to removably mount over the first inner shell 204. The connecting portion 400 may be fixedly attached to the first inner shell 204. Preferably, the first inner shell 204 is made of soft material, the first outer frame 202 is made of hard material, and the connecting portion 400 is made of soft material. More preferably, the first inner shell 204 and the connecting portion 400 are made of thermoplastic polyurethane (TPU), and the first outer frame 202 is made of polycarbonate (PC). The first inner shell 204 and the connecting portion 400 may be integrally constructed by a single molding. Alternatively, the connecting portion 400 may be attached to the first case 200 using adhesives.

According to an embodiment, the first portion 20 of the foldable mobile device 10 may further comprises a rear display, and in this case, the first case 200 may further comprise an aperture 220 to expose the rear display so that a user can see the rear display.

According to an embodiment, a first pad 210 may be attached to one surface of the first inner shell 204 to contact the first portion 20. The first inner shell 204 may or may not have a recessed space such that all or at least part of the first pad 210 may fit in the first inner shell 204. When the first portion 20 is in full contact with the first case 200, the first portion 20 is prone to get scratches or dents. If the first portion 20 can be installed in the first case 200 in a manner such that the first portion 20 is prevented from being dislodged from the first case 200, and at the same time in a manner such that the first portion 20 does not come in substantially full contact with the first case 200, then the first portion 20 may be protected from scratches or dents.

The first pad 210 props and supports one surface of the first portion 20 so that the first portion 20 does not come in substantially full contact with the first case 200. Preferably, the first pad 210 comprises adhesive non-slip material. The non-slip first pad 210 may prevent slippage of the first portion 20. At the same time, the non-slip first pad 210 may prevent dislodging of the first portion 20 that may occur because the first pad 210 is disposed between the first portion 20 and the first case 200. According to an embodiment, the first case 200 may comprise a plurality of first pads 210, but the position of each first pad 210 is not specifically limited to what is shown in FIG. 3. According to an embodiment, the first pad 210 may be attached to inner side surfaces of the first inner shell 204.

According to an embodiment, the first pad 210 protrudes beyond the floor of the first inner shell 204 by about 0.2 mm and about 0.8 mm. If protrusion of the first pad 210 is too small, the first pad 210 may not cause non-slip or minimize contact between the first portion 20 and the first case 200. Conversely, if protrusion of the first pad 210 is too great, then the first portion 20 and the first case 200 may be easily separated from each other. Thus, protrusion of the first pad 210 should be adjusted to be in a proper height. If the first pad 210 protrudes beyond the floor of the first inner shell 204 by about 0.2 mm to about 0.8 mm, then the first pad 210 may cause non-slip and minimize contact between the first portion 20 and the first case 200, while minimizing dislodging of the first portion 20 that may occur because of the first pad 210 being disposed between the first portion 20 and the first case 200.

According to an embodiment, the first case 200 may further comprise a ridge (not shown) that protrudes from an outer surface thereof. This ridge may prevent scratches to the outer surface of the first case 200.

Figure 4:
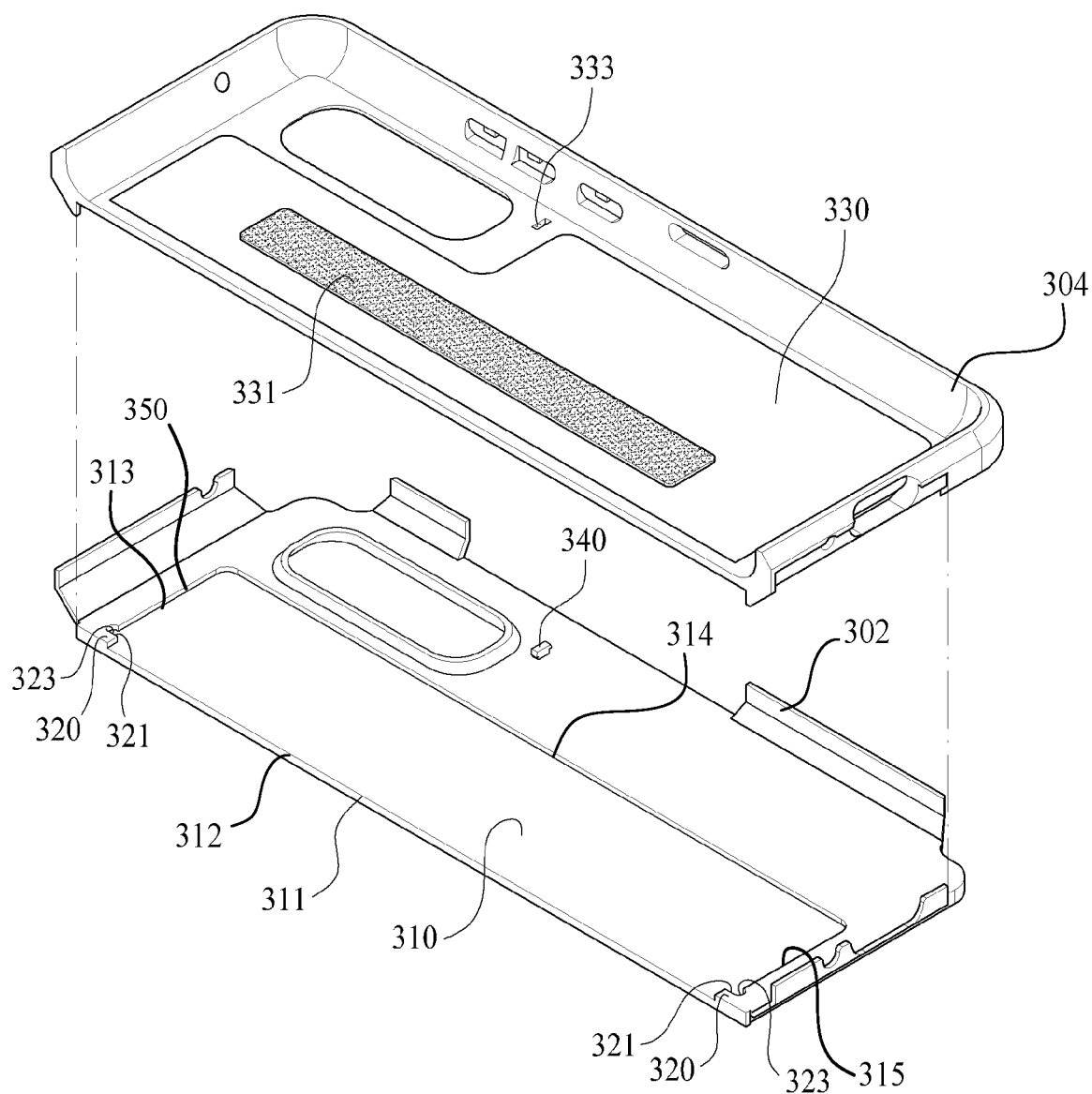
FIG. 4 is an exploded front perspective view of a second case of the protective case for the foldable mobile device according to an embodiment of the present invention.

FIG. 4 illustrates the second case 300 of the protective case for foldable mobile device 100 according to an embodiment. The second case 300 is constructed to protect the second portion 30 of the foldable mobile device 10 installed therein. As shown in FIG. 4, the second case 300 may comprise a second outer frame 302 having a recess 310 to receive the connecting portion 400; and a recess cover 330 for covering the recess 310. In this embodiment, the connecting portion 400 may slidably move in the recess 310, and be covered by the recess cover 330 while received in the recess 310. The second case 300 may further comprise a second inner shell 304, wherein the second outer frame 302 is constructed to removably mount over the second inner shell 304.

According to an embodiment, the second inner shell 304 may include an opening such that the recess cover 330 is removably received in the opening. The recess cover 330 may fit tightly or snugly into the second inner shell 304 such that the recess cover 330 is not easily dislodged from the second inner shell 304. Alternatively, the recess cover 330 may be fixedly received in the opening using adhesives such as glue or the like. Preferably, the second outer frame 302 is made of hard material, the recess cover 330 is made of hard material, and the second inner shell 304 is made of soft material. More preferably, the second outer frame 302 is made of polycarbonate (PC), the recess cover 330 is made of polycarbonate (PC), and the second inner shell 304 is made of thermoplastic polyurethane (TPU).

In another embodiment, the second inner shell 304 and the recess cover 330 may be integrally constructed by overmolding such that the recess cover 330 is made by a molding and then the second inner shell 304 is made by a molding around an outer perimeter of the recess cover 330. The recess cover 330 may comprise a molding groove (not shown) or a molding protrusion (not shown) along an outer peripheral edge thereof, thus, providing a stronger bond between the second inner shell 304 and the recess cover 330. Preferably, the second outer frame 302 is made of hard material, the recess cover 330 is made of hard material, and the second inner shell 304 is made of soft material. More preferably, the second outer frame 302 is made of polycarbonate (PC), the recess cover 330 is made of polycarbonate (PC), and the second inner shell 304 is made of thermoplastic polyurethane (TPU).

In yet another embodiment, the second inner shell 304 and the recess cover 330 may be integrally constructed by a single molding and made of soft material such as thermoplastic polyurethane (TPU).

The recess 310 may be formed inside the second case 300 for receiving the connecting portion 400. The recess 310 provides a space wherein the connecting portion 400 may slidably move. According to an embodiment, the recess 310 may comprise a first side 312, a second side 313, a third side 314, and a fourth side 315. The first side and third sides (312, 314) of the recess 310 face each other, and the second and fourth sides (313, 315) of the recess 310 face each other. The first side 312 is open towards an exterior of the second case 300 while the second, third, and fourth sides (313, 314, 315) are constructed to form side walls of the recess 310.

Preferably, a guiding portion 350 is formed on the second side 313 to guide sliding movement of the connecting portion 400. In this embodiment, when the second inner shell 304 covers the recess 310, an opening 311 is formed on the first side 312 of the recess 310. Through this opening 311, at least part of the connecting portion 400 may slidably move into or out of the recess 310 along the guiding portion 350. Preferably, the recess 310 has a substantially rectangular shape, the first and third sides (312, 314) are parallel to each other, and the second and fourth sides (313, 315) are parallel to each other.

According to an embodiment, the guiding portion 350 may comprise a longitudinal groove (not shown) such that at least part of the connecting portion 400 may run in the longitudinal groove. Alternatively, the guiding portion 350 may comprise a rail structure (not shown) such that the connecting portion 400 may run in the rail.

According to an embodiment, the guiding portion 350 may be formed on the second side 313, the fourth side 315, or both second and fourth side 315s facing each other. In another embodiment, the guiding portion 350 may be formed on a floor of the recess 310. Preferably, the connecting portion 400 may slidably move in a substantially linear manner in the recess 310.

The second side 313 of the recess 310 may further comprise a projection 320 protruded therefrom. The projection 320 is constructed to prevent the connecting portion 400 from being dislodged from the recess 310 when the connecting portion 400 slides along the recess 310. In other words, the projection 320 may restrict a sliding distance of the connecting portion 400 to a predetermined distance within the recess 310. The projection 320 is constructed to restrict the sliding movement of the connecting portion 400, but a shape of the projection 320 is not specifically limited to what is shown in FIG. 4.

The recess cover 330 may cover at least one surface of the recess 310, and support one surface of the connecting portion 400 received by the recess 310. When the connecting portion 400 slides in the recess 310, the recess cover 330 may help maintain a stable sliding movement of the connecting portion 400. At the same time, the recess cover 330 may physically isolate the recess 310 in the second case 300 to avoid disturbing the sliding movement of the connecting portion 400. Therefore, the recess cover 330 may prevent scratches to the second portion 30, which may occur during repeated sliding movements of the connecting portion 400.

According to an embodiment, a second pad 331 may be attached to one surface of the second inner shell 304 to contact the second portion 30. The second inner shell 304 may or may not have a recessed space such that all or at least part of the second pad 331 may fit in the second inner shell 304. When the second portion 30 is in full contact with the second case 300, the second portion 30 is prone to get scratches or dents. If the second portion 30 can be installed in the second case 300 in a manner such that the second portion 30 is prevented from being dislodged from the second case 300, and at the same time in a manner such that the second portion 30 does not come in substantially full contact with the second case 300, then the second portion 30 may be protected from scratches or dents.

The second pad 331 props and supports one surface of the second portion 30 so that the second portion 30 does not come in substantially full contact with the second case 300. Preferably, the second pad 331 comprises adhesive non-slip material. The non-slip second pad 331 may prevent slip of the second portion 30. At the same time, the non-slip second pad 331 may prevent dislodging of the second portion 30 that may occur because the second pad 331 is disposed between the second portion 30 and the second case 300. According to an embodiment, the second case 300 may comprise a plurality of second pads 331, but the position of each second pad 331 is not specifically limited to as shown in FIG. 4. According to an embodiment, the second pad 331 may be attached to inner side surfaces of the second inner shell 304.

According to an embodiment, the second pad 331 is protruded beyond a floor of the recess cover 330 by about 0.2 mm and about 0.8 mm. If protrusion of the second pad 331 is too small, the second pad 331 may not have effects of non-slip or minimizing contact between the second portion 30 and the second case 300. Conversely, if protrusion of the second pad 331 is too great, then the second portion 30 and the second case 300 may be easily separated from each other. Thus, protrusion of the second pad 331 should be adjusted to be in a proper height. If the second pad 331 protrudes beyond the floor of the recess cover 330 by about 0.2 mm to about 0.8 mm, then the second pad 331 may have effects of non-slip and minimizing contact between the second portion 30 and the second case 300, while minimizing dislodging of the second portion 30 that may occur because the second pad 331 is disposed between the second portion 30 and the second case 300.

According to an embodiment, the second case 300 may further comprise a ridge (not shown) that protrudes from an outer surface thereof. This ridge may prevent scratches to the outer surface of the second case 300.

Figure 5:
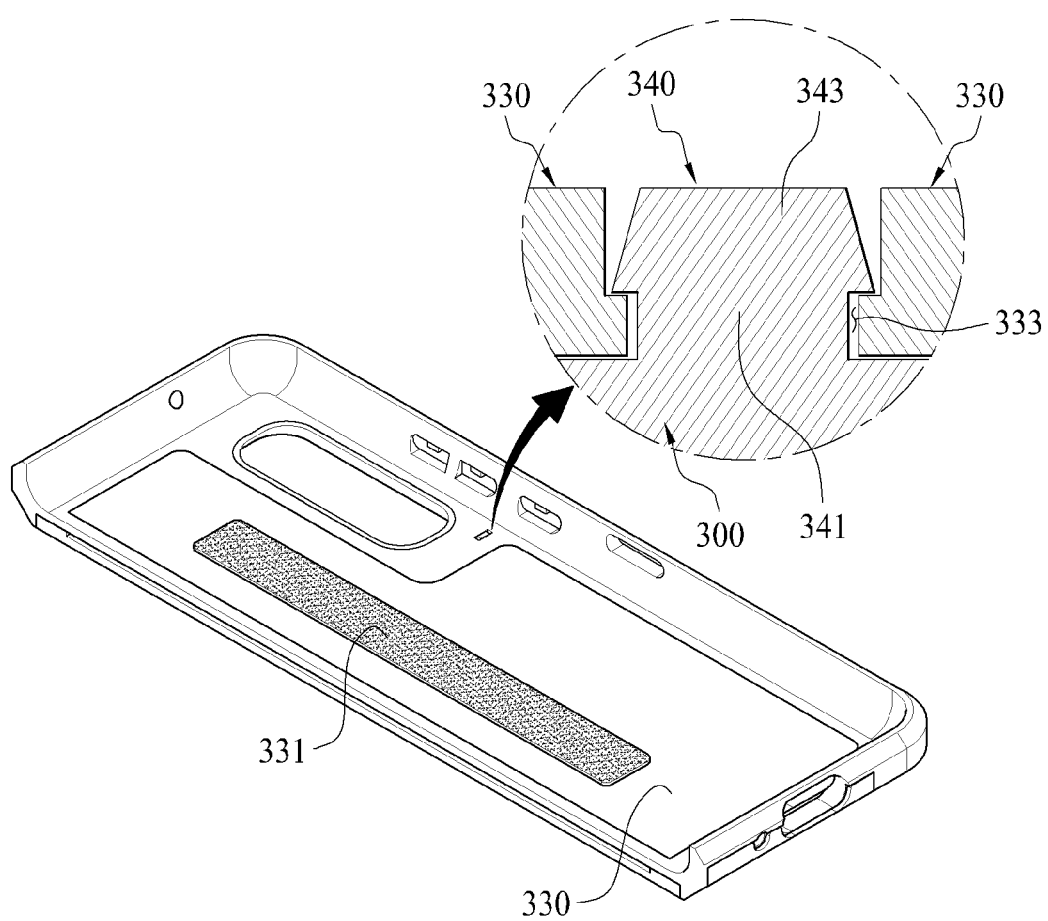
FIG. 5 is a front perspective view of the second case of the protective case for the foldable mobile device wherein a second outer frame is mounted over a second inner shell according to an embodiment of the present invention.

FIG. 5 illustrates the second case 300 of the protective case 100 according to an embodiment, wherein the second outer frame 302 is mounted over the second inner shell 304. In an embodiment, the second outer frame 302 may comprise a fixing member 340 and the second inner shell 304 may comprise a fixing hole 333. Alternatively, the second outer frame 302 may comprise a fixing hole and the second inner shell 304 may comprise a fixing member. The fixing member 340 may comprise a head 343 having a width substantially larger than the lower body 341 of the fixing member 340. The fixing member 340 may fix the second inner shell 304 to the second outer frame 302 by penetrating the second inner shell 304.

As shown in FIG. 5, the head 343 of the fixing member 340 may fit in the fixing hole 333, which has a stepped inner wall, while penetrating the second inner shell 304. Because the head 343 of the fixing member 340 has a substantially larger width than the body 341, the movement of the second inner shell 304 is restricted when the head 343 of the fixing member 340 fixedly mounts on the stepped inner wall of the fixing hole 333. In other words, the body 341 of the fixing member 340 may fit in the fixing hole 333 to support a lower portion of the second inner shell 304, and the head 343 of the fixing member 340 may fit in the fixing hole 333 to support an upper portion of the second inner shell 304. Therefore, the second inner shell 304 may be stably fixed to the second outer frame 302 due to the fixing member 340. Such a fixing hole 333 or the fixing member 340 may or may not be on the recess cover 330.

Figure 6:
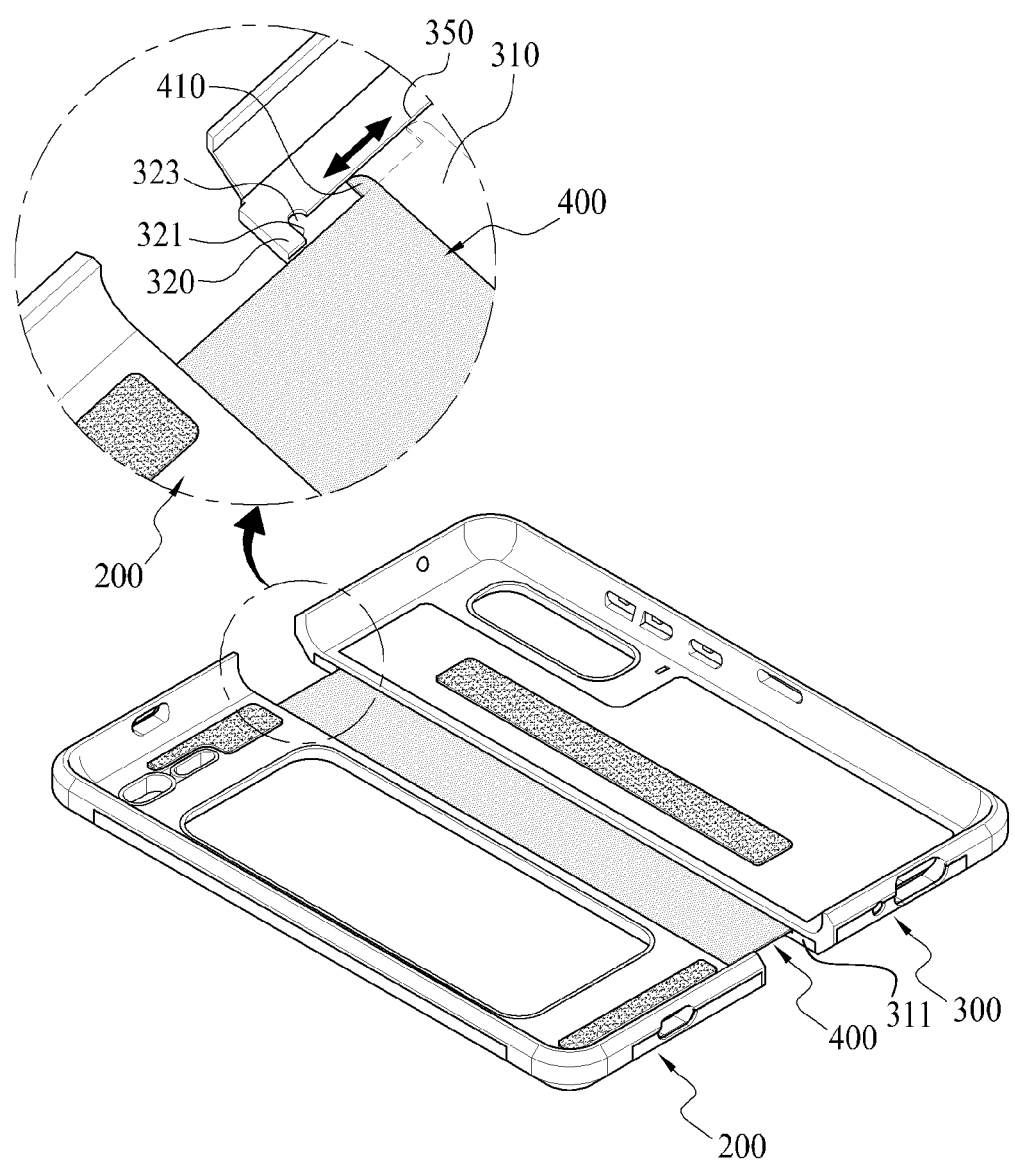
FIG. 6 is a front perspective view of the protective case for the foldable mobile device wherein a connecting portion is received by a recess of the second case according to an embodiment of the present invention.

FIG. 6 illustrates the protective case 100 according to an embodiment, wherein the connecting portion 400 is received by the recess 310 of the second case 300. The connecting portion 400 may comprise a protruding member 410 projecting from one side thereof. The protruding member 410 slides along the guiding portion 350 of the recess 310. Preferably, the guiding portion 350 is constructed to be in contact with the protruding member 410 to restrict the sliding movement of the connecting portion 400. Such a guiding portion 350 helps maintain a more stable sliding movement of the connecting portion 400 in the recess 310.

In an embodiment, the recess 310 further comprises a locking groove 323 on at least one of the first, second, third, or fourth side 315s of the recess 310. This locking groove 323 is constructed such that at least part of the protruding member 410 may fit in or be removed from the locking groove 323. Preferably, the locking groove 323 is formed on the second side 313 of the recess 310 and continuous with a step 321 of the projection 320, as shown in FIG. 6. In this embodiment, when the second inner shell 304 covers the recess 310, the opening 311 is formed on the first side 312 of the recess 310. Through this opening 311, at least part of the connecting portion 400 may slidably move into or out of the recess 310 along the guiding portion 350.

As shown in FIG. 6, when the foldable mobile device 10 is being folded, bent, or rotated, the protruding member 410 may slide towards the projection 320 such that at least part of the protruding member 400 fits in the locking groove 323. Conversely, when the foldable mobile device 10 is being unfolded or returned to a flat configuration, the protruding member 410 may slide away from the projection 320 such that at least part of the protruding member 400 is removed from the locking groove 323. As such, the sliding movement of the protruding member 410 may be more stably maintained in the recess 310 by the projection 320 and locking groove 323. This may prevent the connecting portion 400 from uneven or derailed sliding movement. Further, due to presence of the connecting portion 400, the protective case 100 may stably protect the joining portion 40 as well as the first portion 20 or second portion 30.

In an embodiment, the locking groove 323 may comprise a curved groove so that at least part of the protruding member 410 may fit in or be removed from the locking groove; however, the shape of the locking groove 323 is not specifically limited to as shown in FIG. 6.

The connecting portion 400 may flexibly change its shape or form in response to folding, bending, or rotation of the foldable mobile device 10. Accordingly, the connecting portion 400 may stably protect the externally exposed joining portion 40 of the foldable mobile device 10. Preferably, the connecting portion 400 may be constructed as an integrated single plate, not an assembly of individual components. According to an embodiment, the connecting portion 400 has a thickness of about 0.5 mm to about 0.7 mm. The thickness of the connecting portion 400 is limited such that the connecting portion 400 may flexibly change its shape or form corresponding to the shape variation of the joining portion 40, while having enough durability to withstand stresses during bending or folding.

Figure 7:
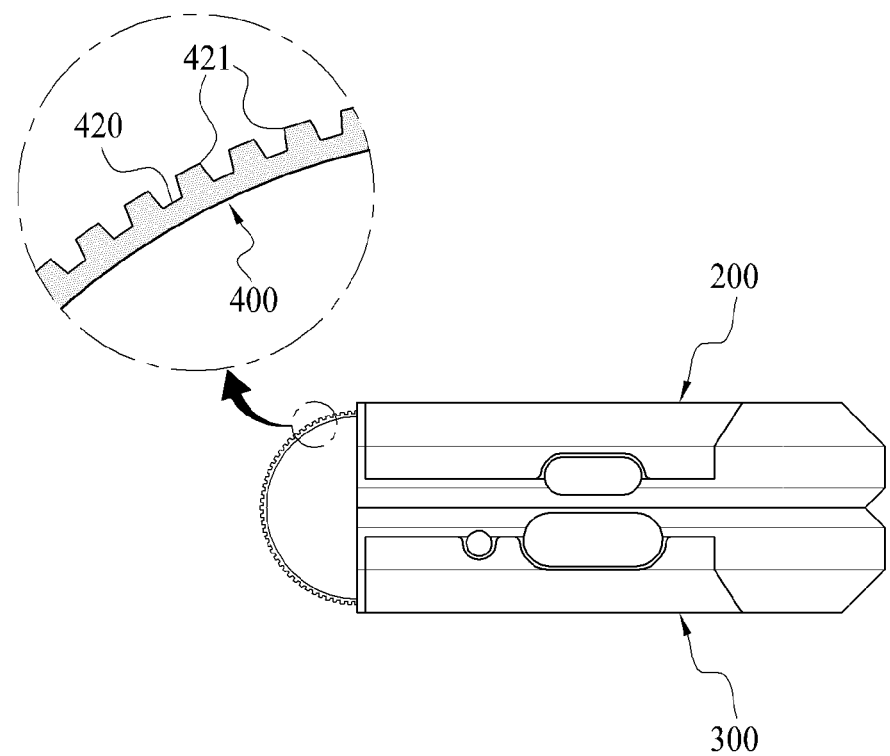
FIG. 7 is an elevational view of the protective case for the foldable mobile device wherein the connecting portion is received by the recess of the second case according to an embodiment of the present invention.

FIG. 7 illustrates the protective case 100 according to an embodiment of the present invention, wherein the connecting portion 400 is received by the recess 310 of the second case 300. According to an embodiment, the connecting portion 400 has one or a plurality of grooves 420 formed on one surface thereof. The groove 420 may provide flexibility such that the connecting portion 400 elastically changes its shape or form to cover the joining portion 40. As shown in FIG. 7, the connecting portion 400 may bend while outer vertices 421 of the groove 420 get closer or farther. The groove 420 may provide a shock-absorbing space to the connecting portion 400 and relieve external shocks in order to protect the joining portion 40.

Preferably, the connecting portion 400, where the groove 420 is formed, has a thickness of about 0.1 mm to about 0.3 mm. When the groove 420 is formed on the connecting portion 400, the connecting portion 400 where the groove 420 is formed becomes thin. Accordingly, this thickness is limited to enable the connecting portion 400 to have a plurality of grooves 420 on one surface, and have enough durability to withstand stresses during folding, bending, or rotation.

Figure 8:
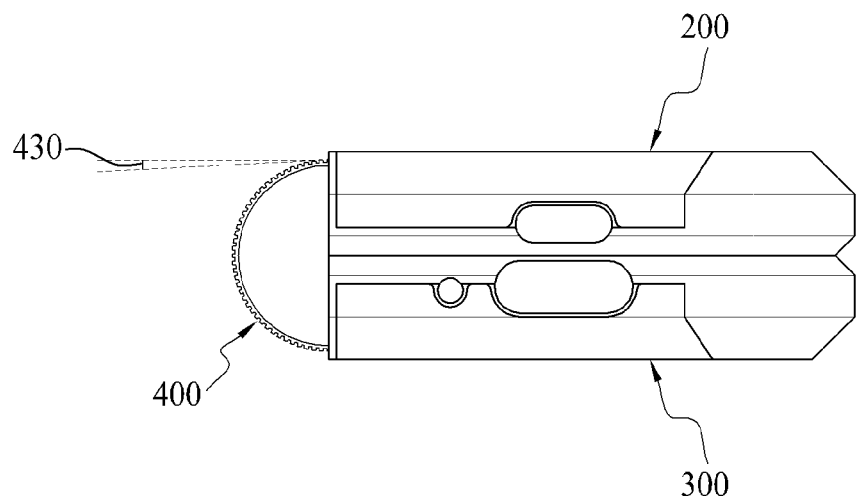
FIG. 8 is an elevational view of the protective case for the foldable mobile device wherein the connecting portion is attached to the first case according to an embodiment of the present invention.

FIG. 8 illustrates the protective case 100 according to an embodiment, wherein the connecting portion 400 is attached to the first case 200. One end of the connecting portion 400 may be integrally connected to an exterior of the first case 200, at an angle 430 with respect to a horizontal plane of the first case. If the connecting portion 400 is connected in parallel to the horizontal plane of the first case 200, the connecting portion 400 may be vulnerable to damages caused by stress accumulated by repeated folding, bending, or rotation. Therefore, attachment of the connecting portion 400 to the first case 200 at an optimal angle may minimize damages to the connecting portion 400 and significantly increase durability of the connecting portion 400.

According to an embodiment, the connecting portion 400 of the protective case 100 may be attached at an inclined angle to the first case 200. As shown in FIG. 8, the angle 430 at which the connecting portion 400 is attached to the first case 200 may slant towards the same direction that the connecting portion 400 is bent while the foldable mobile device 10 is being folded, bent, or rotated. Preferably, this angle 430 may be of about 2° to about 3°, and more preferably, 2.15°. This angle 430 was determined and calculated through repeated simulations. The angle corresponds to an angle that may maximally secure durability of the connecting portion 400. The durability of the connecting portion 400 may change significantly even with a slight angle change; thus, simulations considering numerous variables should be performed at about 2° to about 3°. Specifically, in order to confirm the durability of the connecting portion 400 relative to variation in angle, simulations should be performed under controlled conditions over a long period of time. Therefore, those skilled in the art cannot determine an optimal angle simply by varying the angles at which the connecting portion 400 is attached to the first case 200.

Figure 9:
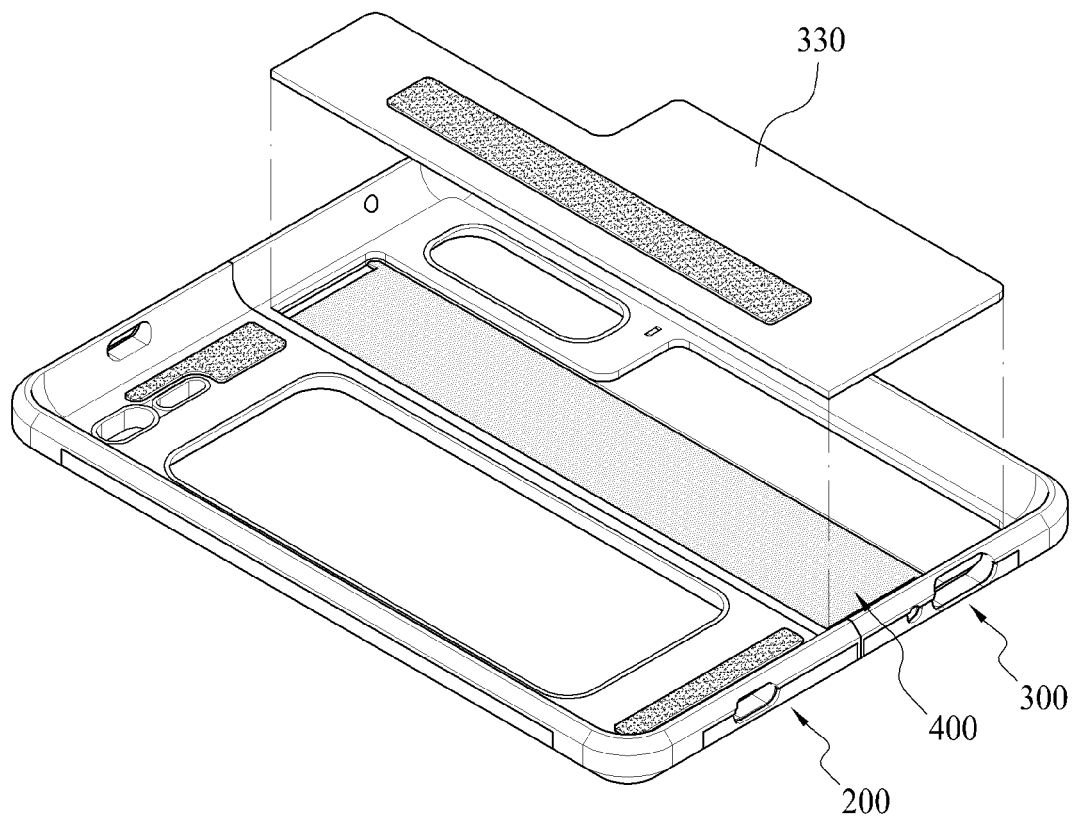
FIG. 9 is an exploded front perspective view of the protective case for the foldable mobile device according to an embodiment of the present invention.

FIG. 9 illustrates the protective case 100 according to an embodiment of the present invention. As shown in FIG. 9, the recess cover 330 may be removably or fixedly received by the second inner shell 304 to cover only the recess 310 portion of the second outer frame 302. According to an embodiment, the recess cover 330 may entirely cover a front surface of the second outer frame 302. In another embodiment, the recess cover 330 and the second inner shell 304 may be integrally constructed by a single molding. Therefore, the shape, form, or structure of the recess cover 330 is not limited to the illustrations in the drawing figures.

Figure 10:
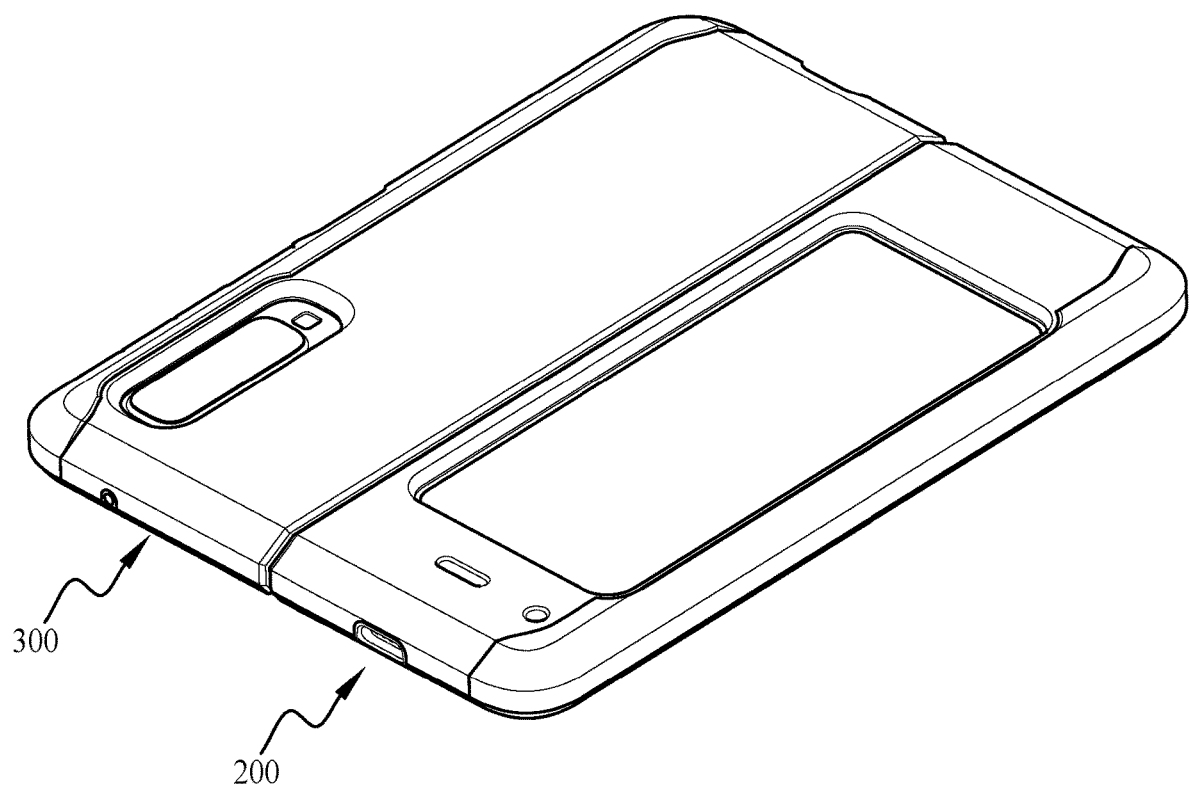
FIG. 10 is a rear perspective view of the protective case for the foldable mobile device according to an embodiment of the present invention where the device is in an unfolded state.
Figure 11:
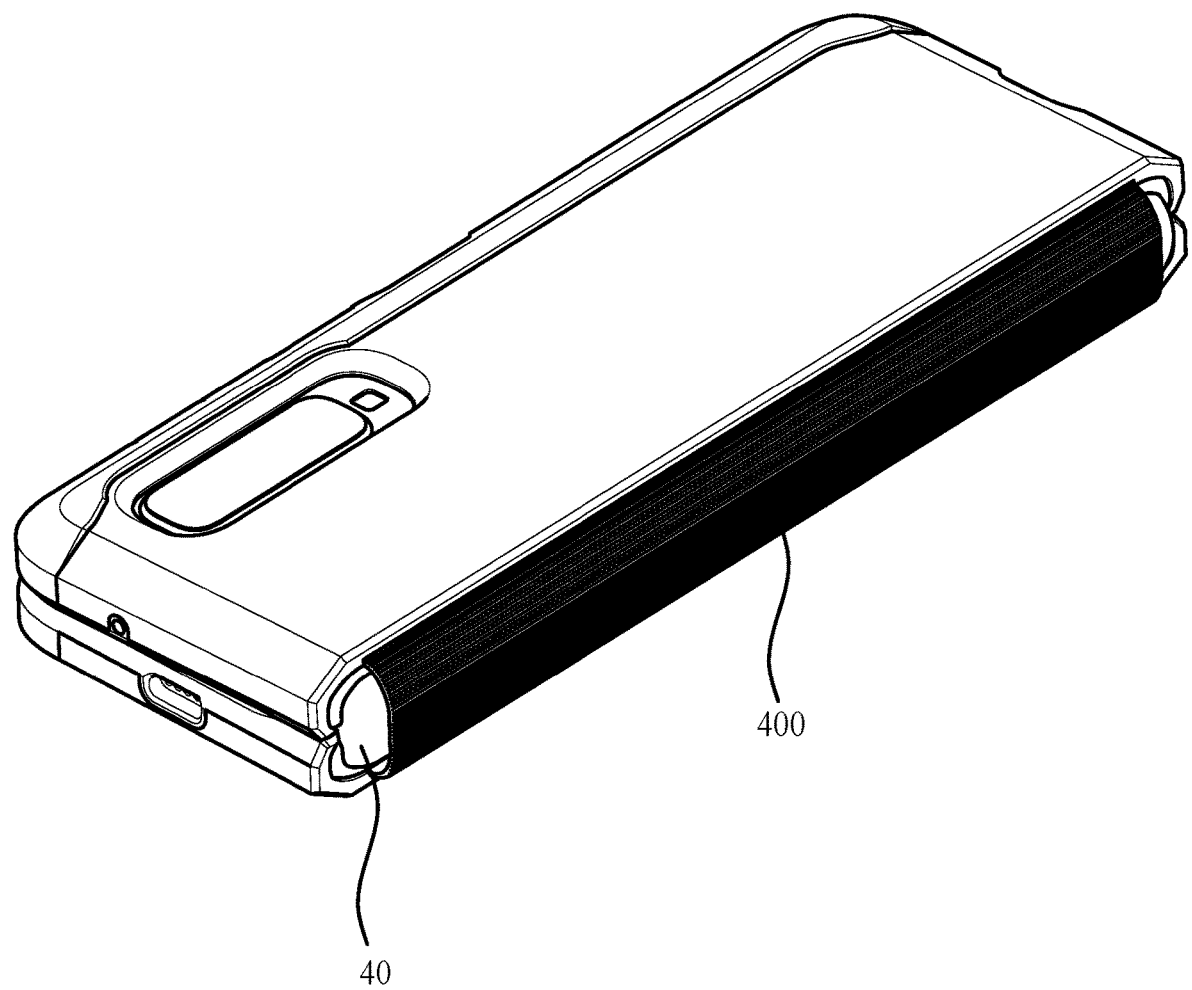
FIG. 11 is a rear perspective view of the protective case for the foldable mobile device according to an embodiment of the present invention where the device is in a folded state.

FIGS. 10 and 11 illustrate rear perspective views of the protective case 100 according to an embodiment of the present invention. As shown in FIG. 10, when the foldable mobile device 10 is in an unfolded state, the first case 200 and the second case 300 protect the first portion 20 and second portion 30 of the foldable mobile device 10 respectively, and the joining portion 400 is substantially fully received in the recess 310 of the second case 300. As shown in FIG. 11, when this foldable mobile device 10 is folded, at least part of the joining portion 400 previously received within the recess 310 may move out of the recess 310 to cover the externally exposed joining portion 40.

Figure 12:
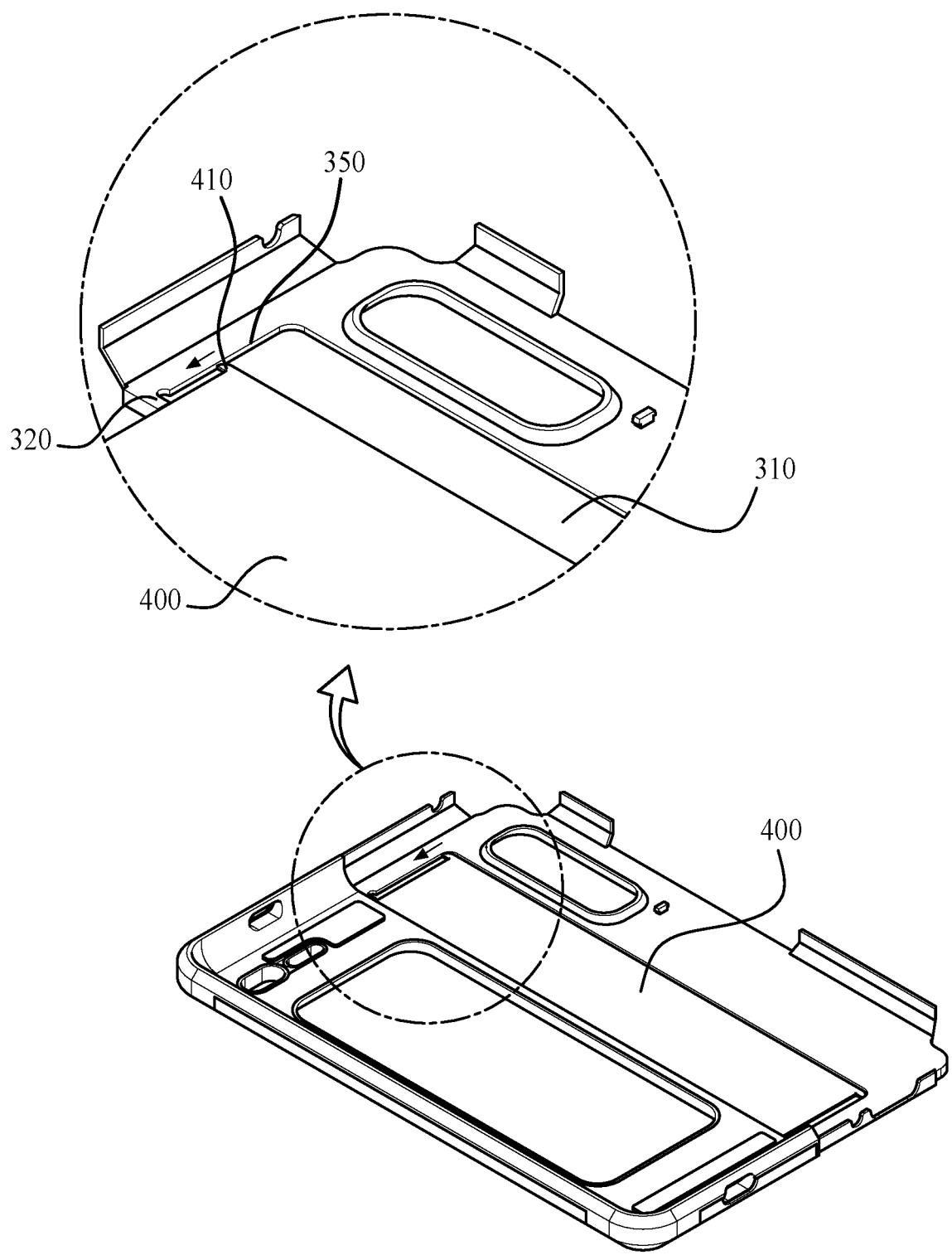
FIGS. 12-13 are enlarged views showing the sliding movement of the connecting portion in the recess according to an embodiment of the present invention.
Figure 13:
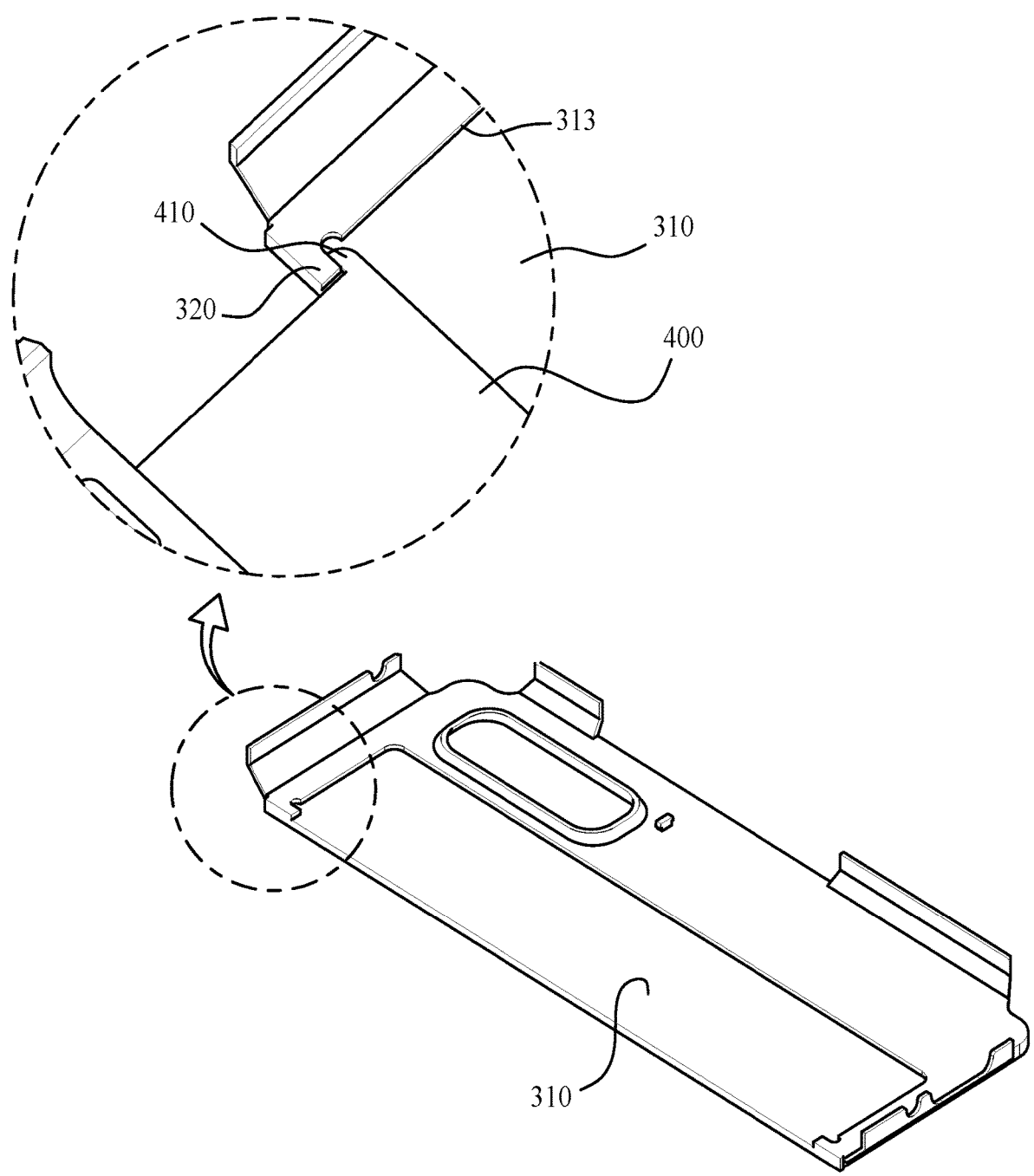

FIGS. 12-13 illustrate enlarged views showing the sliding movement of the connecting portion 400 in the recess 310 according to an embodiment of the present invention. When the foldable mobile device 10 is folded, bent, or rotated, the protruding member 410 of the connecting portion 400 may slidably move along the guiding portion 350 in the direction towards the projection 320 such that at least part of the connecting portion 400 moves out of the recess 310, as shown in FIG. 12. In this embodiment, the projection 320 may be formed on the second side 313 of the recess 310 to prevent a further movement of the protruding member 410 of the connecting portion 400. Thereupon, the connecting portion 400 is prevented from being completely dislodged from the recess 310, as shown in FIG. 13.

Figure 14:
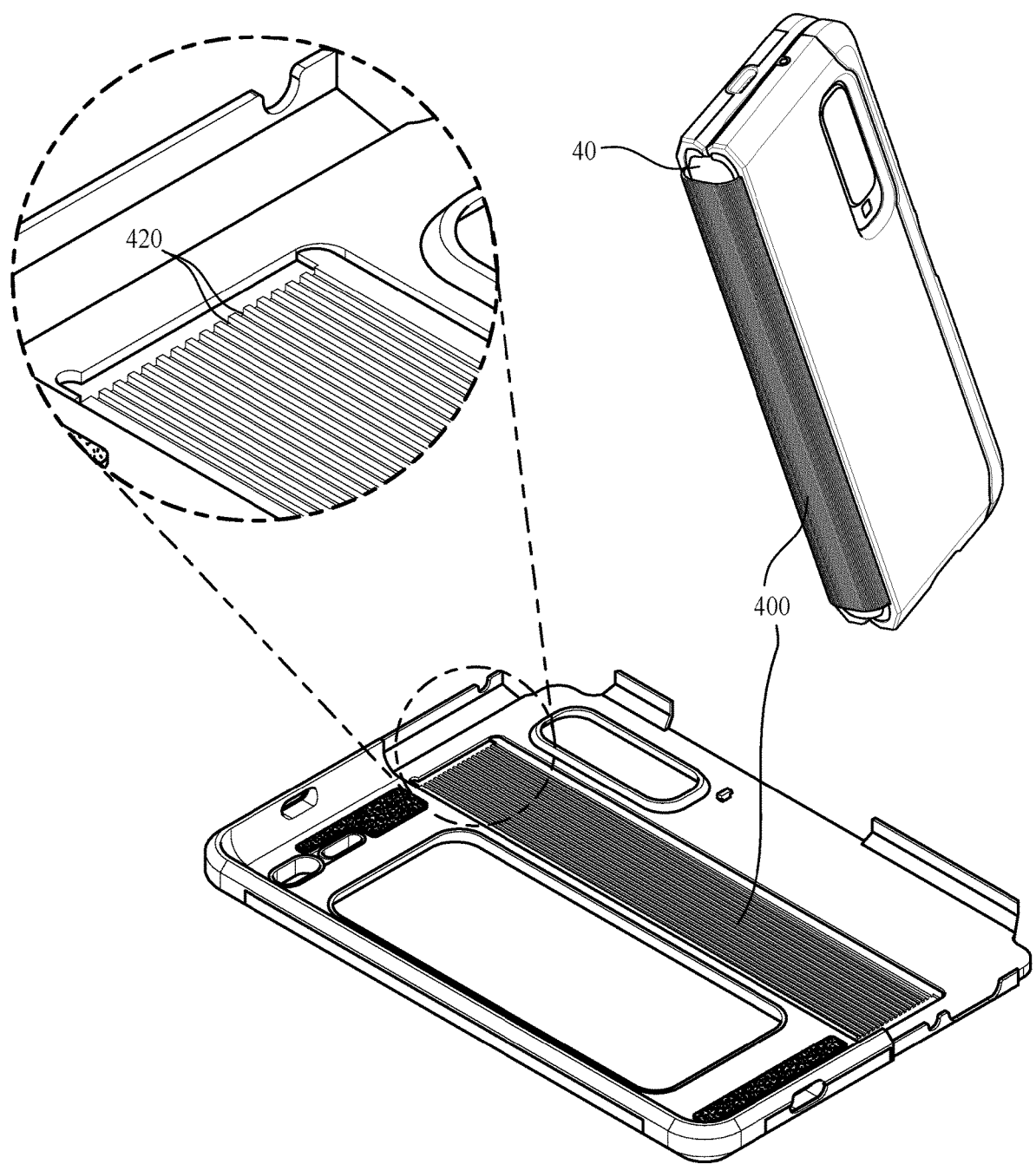
FIG. 14 is a perspective view of the protective case for the foldable mobile device according to an embodiment of the present invention where the connecting portion has grooves on both front and rear surfaces.

FIG. 14 illustrates a front perspective view of the protective case 100 according to an embodiment of the present invention, wherein the connecting portion 400 has grooves 420 on both surfaces. In other words, one or a plurality of grooves 420 may be formed on both front and rear surfaces of the connecting portion 400. In this embodiment, grooves 420 formed on the front surface of the connecting portion 400 alternate with grooves 420 formed on the rear surface of the connecting portion 400. If the grooves 420 on the front and rear surfaces are aligned with each other, then the connecting portion 400, where the grooves 420 are formed, may be too thin to effectively withstand stresses during folding, bending, or rotation. If the grooves on the front surface and the grooves on the rear surface alternate with each other, then the connecting portion 400 may still be durable enough to withstand stresses during folding, bending, or rotation, even if the grooves 420 are formed on both surfaces of the connecting portion 400.

While the invention has been shown and described with reference to different embodiments thereof, it will be appreciated by those skilled in the art that variations in form, detail, compositions and operation may be made in these embodiments. Therefore, the scope of the present invention is not limited to the embodiments disclosed or illustrated herein.

REFERENCE NUMERALS

10: foldable mobile device
20: first portion
30: second portion
40: joining portion
100: protective case for foldable mobile device
200: first case
202: first outer frame
204: first inner shell
210: first pad
220: aperture
300: second case
302: second outer frame
304: second inner shell
310: recess
311: opening
312: first side
313: second side
314: third side
315: fourth side
320: projection
321: step
323: locking groove
330: recess cover
331: second pad
333: fixing hole
340: fixing member
341: body
343: head
350: guiding portion
400: connecting portion
410: protruding member
420: groove
421: vertex
430: angle

What is claimed is:

1. A protective case for a foldable mobile device which has a first portion, a second portion, and a joining portion wherein the joining portion connects the first portion and the second portion, comprising:
a first case for protecting the first portion of the foldable mobile device installed therein;
a connecting portion for covering the joining portion of the foldable mobile device; and
a second case for protecting the second portion of the foldable mobile device installed therein wherein the second case includes a second outer frame,
wherein the connecting portion is fixedly attached to the first case,
wherein the second outer frame includes a recess to receive the connecting portion,
wherein the second case further comprises a recess cover for covering the recess,
wherein the connecting portion slidably moves in the recess such that a portion of the connecting portion is covered by the recess cover when the portion is slidably moved in the recess, and
wherein the portion of the connecting portion lies between the recess and the recess cover.

2. The protective case of claim 1, wherein the second case further comprises a second inner shell,
wherein the second outer frame is constructed to removably mount over the second inner shell.

3. The protective case of claim 2, wherein the second inner shell has an opening such that the recess cover is removably or fixedly received in the opening.

4. The protective case of claim 3, wherein the second inner shell is made of soft material, the second outer frame is made of hard material, and the recess cover is made of hard material.

5. The protective case of claim 4, wherein the second inner shell is made of thermoplastic polyurethane (TPU), the second outer frame is made of polycarbonate (PC), and the recess cover is made of polycarbonate (PC).

6. The protective case of claim 2, wherein the second inner shell is made of soft material, the second outer frame is made of hard material, and the recess cover is made of hard material.

7. The protective case of claim 6, wherein the second inner shell is made of thermoplastic polyurethane (TPU), the second outer frame is made of polycarbonate (PC), and the recess cover is made of polycarbonate (PC).

8. The protective case of claim 6, wherein the second inner shell and the recess cover are integrally constructed by over-molding such that the recess cover is made by a molding and then the second inner shell is made by a molding around an outer perimeter of the recess cover.

9. The protective case of claim 2, wherein a first side of the recess is open towards an exterior of the second case,
wherein the recess comprises a guiding portion formed on a second side thereof to guide sliding movement of the connecting portion.

10. The protective case of claim 9, wherein the connecting portion comprises a protruding member projecting from one side thereof,
wherein the protruding member slides along the guiding portion,
wherein a projection is protruded from the second side of the recess to prevent the connecting portion from being dislodged.

11. The protective case of claim 10, wherein the recess further comprises a locking groove,
wherein the locking groove is constructed such that at least part of the protruding member fits in or is removed from the locking groove.

12. The protective case of claim 2, wherein the second inner shell has a non-slip second pad attached to one surface of the second inner shell.

13. The protective case of claim 1, wherein the first case comprises a first inner shell made of soft material,
wherein the connecting portion is made of soft material,
wherein the first inner shell and the connecting portion are integrally constructed by a single molding.

14. The protective case of claim 13, wherein the first case further comprises a first outer frame made of hard material,
wherein the first outer frame is constructed to removably mount over the first inner shell.

15. The protective case of claim 13, wherein the first inner shell has a non-slip first pad attached to one surface of the first inner shell.

16. The protective case of claim 1, wherein the connecting portion has a plurality of grooves.

17. The protective case of claim 1, wherein the connecting portion is attached to the first case at an angle with respect to a horizontal plane of the first case, in a range of about 2° to about 3°.

18. A protective case for a foldable mobile device which has a first portion, a second portion, and a joining portion wherein the joining portion connects the first portion and the second portion, comprising:
   a first case for protecting the first portion of the foldable mobile device installed therein;
   a connecting portion for covering the joining portion of the foldable mobile device; and
   a second case for protecting the second portion of the foldable mobile device installed therein, which includes a second inner shell and a second outer frame wherein the second outer frame is constructed to removably mount over the second inner shell,
   wherein the connecting portion is fixedly attached to the first case,
   wherein the second outer frame includes a recess to receive the connecting portion and the second inner shell covers the recess,
   wherein the connecting portion slidably moves in the recess such that a portion of the connecting portion is covered by the second inner shell when the portion is slidably moved in the recess, and
   wherein the portion of the connecting portion lies between the recess and the second inner shell.

19. The protective case of claim 18, wherein the first case comprises a first outer frame made of hard material and a first inner shell made of soft material,
   wherein the first outer frame is constructed to removably mount over the first inner shell,
   wherein the connecting portion is made of soft material,
   wherein the first inner shell and connecting portion are integrally constructed by a single molding,
   wherein the second inner shell is made of soft material and the second outer frame is made of hard material.

20. The protective case of claim 18, wherein a first side of the recess is open towards an exterior of the second case,
   wherein the recess comprises a guiding portion formed on a second side thereof to guide sliding movement of the connecting portion,
   wherein the connecting portion comprises a protruding member projecting from one side thereof,
   wherein the protruding member slides along the guiding portion,
   wherein a projection is protruded from the second side of the recess to prevent the connecting portion from being dislodged,
   wherein the recess further comprises a locking groove,
   wherein the locking groove is constructed such that at least part of the protruding member fits in or is removed from the locking groove.

\* \* \* \* \*